(No Model.)

J. H. PATTERSON.
INTRENCHING TOOL.

No. 350,151. Patented Oct. 5, 1886.

UNITED STATES PATENT OFFICE.

JOHN H. PATTERSON, OF FORT ASSINABOINE, MONTANA TERRITORY.

INTRENCHING-TOOL.

SPECIFICATION forming part of Letters Patent No. 350,151, dated October 5, 1886.

Application filed July 7, 1886. Serial No. 207,365. (No model.)

*To all whom it may concern:*

Be it known that I, JOHN H. PATTERSON, an officer of the United States Army, stationed and residing at Fort Assinaboine, in the Territory of Montana, have invented a new and useful Implement for Use as an Intrenching-Tool, an improvement upon that referred to and granted me in Letters Patent No. 297,640, 1884, of which (the improvement) the following is a specification.

The purpose of my invention is to provide a pick and hoe or shovel combined to be carried as a complete implement and used by soldiers on active service to throw up slight parapets for their protection against the fire of small-arms.

Figure 1:
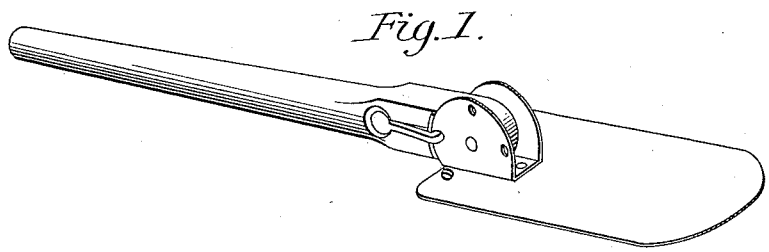
Figure 2:
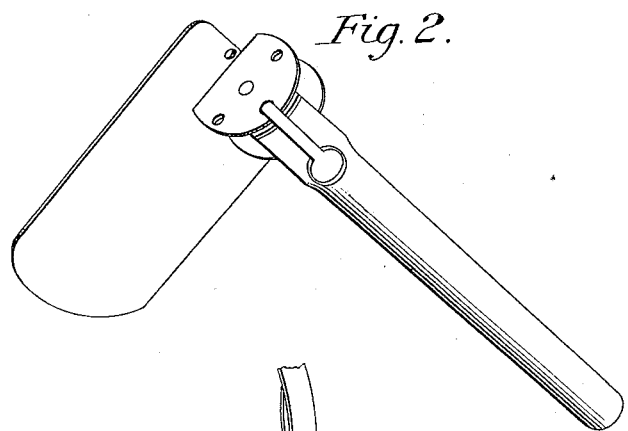
Figure 3:
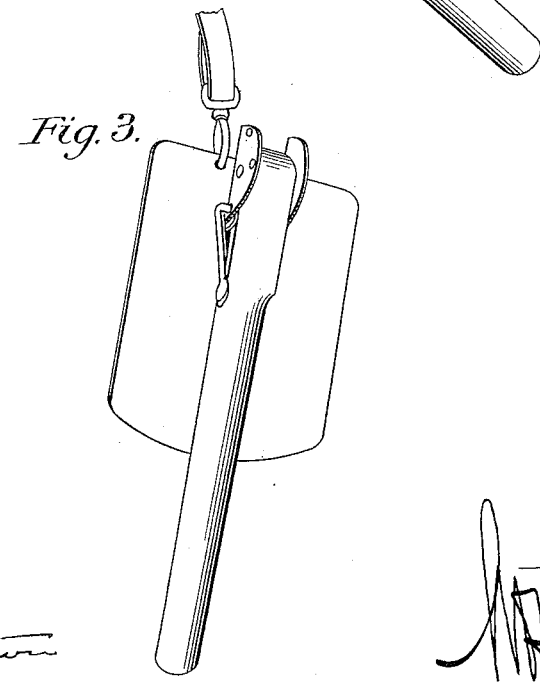

Figure 1 shows a view of the intrenching-tool arranged for use as a hoe or pick. Fig. 2 shows a view of the intrenching-tool arranged for use as a shovel. Fig. 3 shows a view of the intrenching-tool when not in use, prepared for carriage by the soldier.

Referring to the drawings herewith, I describe my improvement as follows: At the top of the blade are attached two lugs with an interval between them sufficient to permit the insertion of a wooden handle. Through the center of the lugs is a bolt-hole. In the left-hand lug—the blade viewed from the front—are three smaller holes located one above, one below, and one in front of the bolt-hole. The last-enumerated holes are to catch a projection or point upon a thumb-latch spring, which, forming part of and attached to the handle, serves to keep the handle in position for use of the implement as either a shovel, hoe, or pick, or for carriage. The lugs, made of one piece, are attached to the top of the blade by riveting the connecting-piece to it, (the blade.) The details of the form and construction of the blade are the same as those described in Letters Patent No. 297,640, before referred to. A wooden handle, the end to be inserted between the lugs and rounded, is attached to the lugs by a bolt, which, passing through the lugs, is secured in place by a nut. The handle moves freely on its axis. Attached to the handle on the left side is a thumb-spring latch with a point or projection to enter either hole in the lug when in place. The thumb-latch is beaded flush with the face of the handle on the side to which it is attached.

I claim—

In an intrenching-tool, a blade having at its top two parallel lugs, one of which is perforated at its top and opposite sides, in combination with a handle pivoted between such lugs and bearing a catch for engaging the holes in the apertured lug, as set forth.

JNO. H. PATTERSON.

Witnesses:
E. T. BROADWATER,
JAMES A. IRONS.